(12) United States Patent  (10) Patent No.: US 6,576,183 B1
Thomas  (45) Date of Patent: Jun. 10, 2003

(54) PROFILE CUTTING APPARATUS

(76) Inventor: David William Thomas, Fraithwen, Tregynon, Newtown, Powys SY163EW (GB)

( * ) Notice: Subject to any disclaimer, the term of this patent is extended or adjusted under 35 U.S.C. 154(b) by 0 days.

(21) Appl. No.: 09/786,708
(22) PCT Filed: Sep. 7, 1999
(86) PCT No.: PCT/GB99/02966
§ 371 (c)(1), (2), (4) Date: Mar. 7, 2001
(87) PCT Pub. No.: WO00/13847
PCT Pub. Date: Mar. 16, 2000

(30) Foreign Application Priority Data

Sep. 7, 1998 (GB) .............................................. 9819473
Jun. 21, 1999 (GB) .............................................. 9914470

(51) Int. Cl.⁷ .............................................. B23K 37/00
(52) U.S. Cl. .......................................... 266/64; 266/48
(58) Field of Search ............................ 266/48, 58, 60, 266/62, 63, 64

(56) References Cited

U.S. PATENT DOCUMENTS

| 1,844,574 | A | * | 2/1932 | Hancock | ....................... 266/64 |
| 2,015,330 | A | * | 9/1935 | Anderson | ..................... 266/64 |
| 2,040,914 | A | * | 5/1936 | Anderson | ..................... 266/64 |
| 3,660,665 | A |   | 5/1972 | Luker |   |
| 3,673,372 | A |   | 6/1972 | Veroman |   |
| 3,704,373 | A |   | 11/1972 | Bardwell et al. |   |
| 4,333,635 | A |   | 6/1982 | Koukal |   |

FOREIGN PATENT DOCUMENTS

EP  0550768  7/1993
EP  0565264  10/1993

* cited by examiner

Primary Examiner—Scott Kastler
(74) Attorney, Agent, or Firm—Horst M. Kasper

(57) ABSTRACT

A cutting apparatus comprises a machine bed support (1) having a quarter circle profile as seen from above and carrying a workpiece supporting platform (5). The workpiece may be a steel plate (6). The rear of the apparatus has an upstanding post (2) forming a vertical pivot to which is rigidly connected upper and lower arms (3) and (4) which may thus swing in a horizontal plane. A frame (7) is supported on the arms (3) and (4) by rollers R for free movement towards and away from the post (2). The lower limb of frame (7) carries the workpiece cutting device (16) and the upper limb of this frame caries a template following sensor device (8). The sensor device (8) is arranged to follow the required profile defined by a drawing or template on table (10) and this is effected by control of two drive motors using photo-electric template following means one motor driving a wheel (12) which frictionally engages the template and the other motor controlling the orientation of the wheel (12). The wheel is thus rotated to travel across the surface of the template and controlled directionally so that the template pattern is followed to produce a corresponding tracking movement of the frame (7) and thus the cutting device (16). In this arrangement the wheel (12) directly moves the frame (7) together with the cutting device 16 avoiding complex drives and couplings.

14 Claims, 3 Drawing Sheets

PROFILE CUTTING APPARATUS

This invention relates to an apparatus for cutting profiles and more particularly to an apparatus for cutting steel plate, plastics and other materials using a template which defines the required profile. The cutting may be effected using gas cutting equipment such as oxyacetylene or by plasma means or by using mechanical means such as fret-saws, punches or the like, as examples.

Profile cutting machines are known but these tend to be highly complex and costly and are thus not suitable for small fabrication works where the accuracy is not required and the cost cannot be Justified.

It is an object of this invention to provide a profile cutting machine which is of simple construction and easy to maintain and operate and which is suitable for the small workshop.

In accordance with this invention there is provided an apparatus for cutting profiles in materials, the apparatus comprising a bed with a platform to support a workpiece to be cut, a workpiece cutting device mounted on a horizontally extending arm and movable therealong, the arm being pivoted for arcuate swinging movement about a vertical axis, a template support positioned in co-planar relationship with the platform and adapted to support a cutting template, a template following device located above the template and adapted to track the required template profile, said device being coupled with the cutting device, the template following device having a sensor associated with a drive means adapted to move the template following device along the required profile defined by the template and being tracked by the sensor through control of the drive means, the sensor movement being thus coupled with the cutting device whereby said device moves to follow the required profile to cut the workpiece.

In one preferred construction there is provided an apparatus for cutting profiles in sheet materials the apparatus comprising a bed with a platform to support the sheet material forming a workpiece to be cut a workpiece cutting device mounted on a first horizontally extending arm pivoted for arcuate swinging movement about a vertical pivot axis, drive means for moving the cutting device along the arm, a template support table positioned in co-planar relationship with the platform and adapted to support a cutting template, drawing or like profile defining means, a second horizontal arm spaced from the first said arm and connected therewith through the pivot axis, the end of the second support arm remote from the pivot being movable by drive means, the second arm having a sensor associated with the drive means adapted to move the sensor along the required profile defined by the template and being tracked by the sensor through control of the drive means, the sensor movement being coupled with the cutting device whereby said cutting device follows the required profile to cut the workpiece.

In a more preferred construction the first and second arms form the limbs of a U-shaped frame the base of which forms a post pivoted on the machine bed. The template support platform may be located above or between the arms. The cutting device and the sensor being connected together by a U-shaped member to move in unison along respective arms.

In another preferred construction there is provided an apparatus for cutting profiles in materials, the apparatus comprising a bed with a platform to support a workpiece to be cut, a workpiece cutting device carried by one horizontally extending limb of a rigid U-shaped frame member mounted on, and movable along, an arm pivoted for arcuate swinging movement about a vertical axis, a template support positioned in co-planar relationship with the platform and adapted to support a cutting template, a template following device located above the template and mounted on the other limb of the U-shaped frame member, said device being adapted to track the required template profile, the template following device having a sensor associated with a drive means adapted to move the template following device along the required profile defined by the template.

In a preferred version each limb of the U-shaped frame member is mounted for movement along a respective arm each connected with a post forming a vertical pivot.

The aforesaid arms may extend from the post in parallel spaced relationship, each limb of the U-shaped frame being mounted to a respective arm by roller assemblies providing freedom of movement therealong.

Preferably the template following device comprises a wheel driven over the surface of the template, the wheel being orientated to follow the template through a photoelectric sensor.

This arrangement, according to the invention, provides a simple construction of profile cutting machine which is able to cut profiles in sheet material to an accuracy which is generally sufficient for the smaller so-called lo "jobbing" engineering workshop. In a broader aspect the essential features of the device according to this invention are the unshaped arms which move together about a vertical pivot and which accommodate the template. The sensor or tracking device on the top arm can move along the arm and is connected rigidly to the cutting device, and also the arms move together in an arcuate manner to provide for cutting in any direction across the plane of the workpiece.

In this invention the movements for transferring the image from the drawing to the cutting head and thus the workpiece are effected by one integral arm operating about one pivot point and giving the operator a full view of the drawing or template as well as the progress of the cutting operation.

This invention will be further described and explained in conjunction with the drawings showing two embodiments by way of examples. In the drawings:

Figure 1:
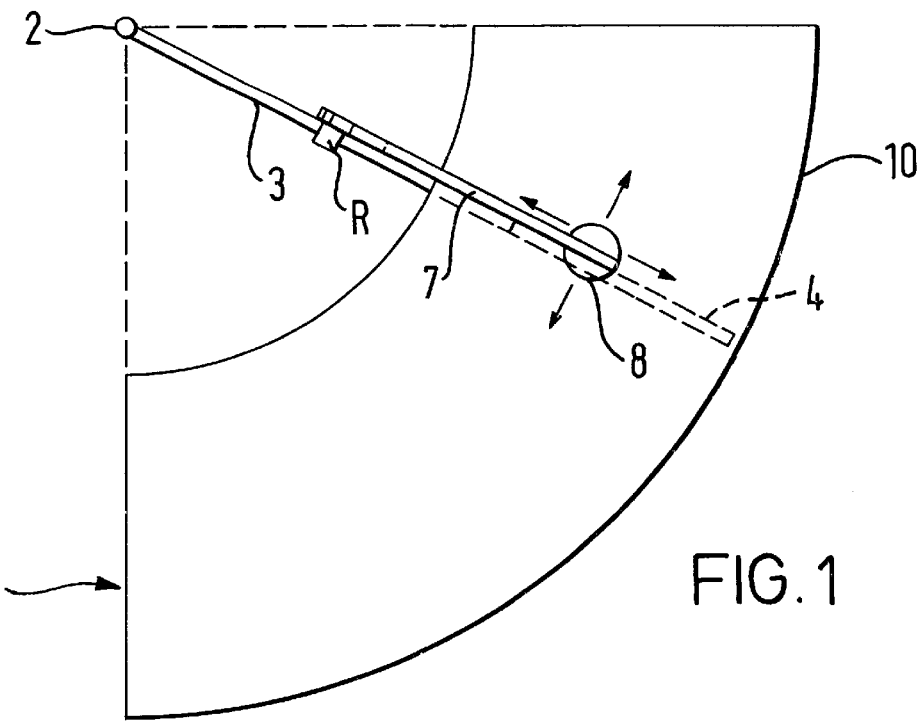
FIG. 1 shows a plan view of the first embodiment of apparatus schematically.
Figure 2:
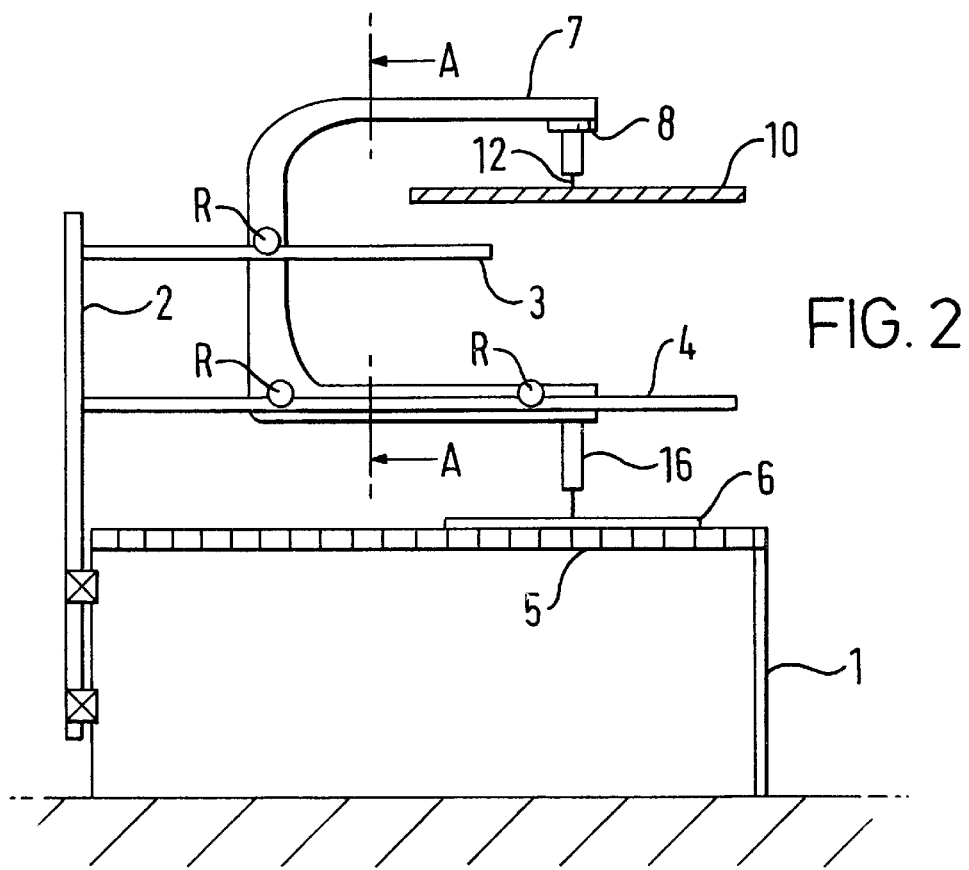
FIG. 2 shows a side view of the apparatus of FIG. 1.
Figure 2A:
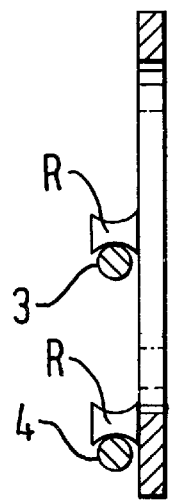
FIG. 2a shows a section on A—A of FIG. 2.

Referring to the FIGS. 1 and 2 of the drawings the cutting apparatus according to this invention comprises a machine bed support 1 having a quarter circle profile as seen from above and carrying a workpiece supporting platform 5. The workpiece here is a steel plate 6. The rear of the apparatus has an upstanding post 2 forming a vertical pivot for the base of a rigid U-shaped frame which includes upper and lower limbs 3 and 4 respectively.

Figure 3:
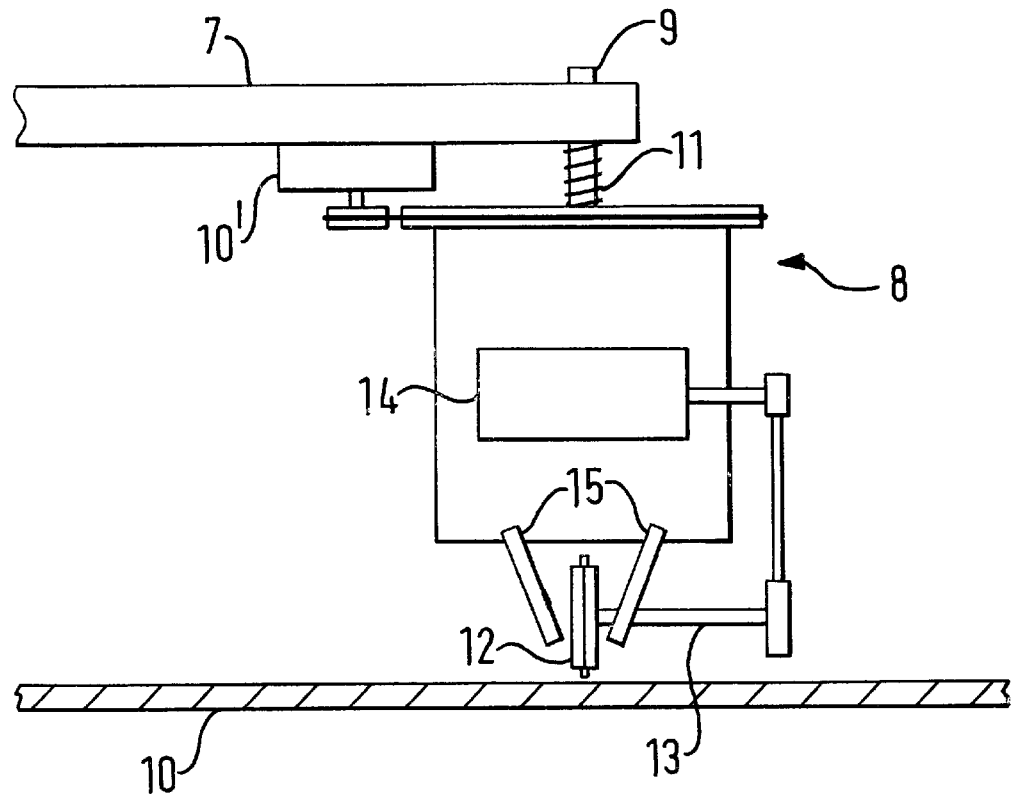
FIG. 3 shows a detail of the sensor drive arrangement.

The arrangement shown in FIG. 2 uses a preferred drive arrangement. In FIG. 1 the upper limb 3 of the U-shaped frame is shown which carries the sensor unit 8 and support frame 7. FIG. 3 shows a detail view of the sensor and drive unit. The sensor unit 8 is carried by a vertical pivot shaft 9 which is rotated through a worm gear or friction or belt drive (as shown) from an electric stepper motor 10¹. The lower part of the sensor unit 8 is pressed down by a spring means 11 so that a rubber tyre drive wheel 12 contacts a template on a table 10. The wheel 12 is driven through a horizontal axle 13 by an electric motor 14 to move over the surface of the template on table 10 and the rubber tyre on the wheel may augment frictional contact.

Positioned each side of the wheel 12 are sensors, such as photocells cooperating with detector means and arranged to control the motor 10¹ and motor 14 to orientate and drive the wheel 12 so that it tracks accurately along the required line of the template. Control methods of this kind are well known.

In this arrangement the wheel 12 serves to directly move the top arm of frame 7 forward and back along the limbs 3 and 4 whilst also turning the limbs 3 and 4 about the pivot post 2. Hence the cutting device 16 follows the track of the template as defined by the wheel 12.

Above a limb 3 the support table 10 for the cutting template, such as a drawing, is positioned.

The sensor is arranged to follow the required profile defined by the drawing or template on table 10 and this is effected by control of the two motors 10¹ and 14. The sensor may be a photoelectric device.

The lower arm 4 carries a cutting device 16 movable in the radial direction and adapted to cut the workpiece 6. The cutting device 16 is connected rigidly through a U-shaped frame 7 with the motor housing unit 8 and thus the sensors 15. Movement of the sensor is thus accurately reproduced as an identical movement of the cutting device 16 through the frame 7. Likewise movement in the rotational direction around pivot 2 by the motor 10¹ and 14 is translated to the cutting device 16.

The template table 10 extends only halfway along the arm 4 in order to give room for movement.

Electronic control means for the motors and the sensor are not shown nor are the gas or electric supplies to the cutting device 16. The sensor may have a photoelectric device which follows the drawing and provides stepwise control to the motors 10¹ and 14.

The frame 7 is supported for movement along the arms 3 and 4 by means of rollers R on the arms 3 and 4.

Figure 4:
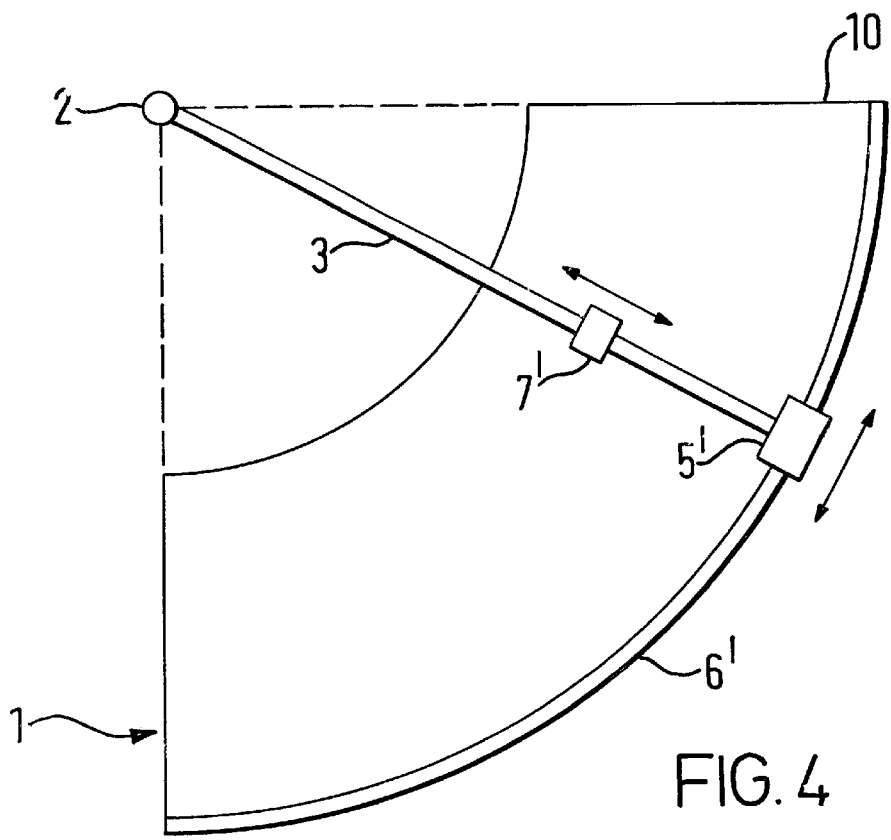
FIG. 4 shows a plan view of a second embodiment of apparatus schematically.
Figure 5:
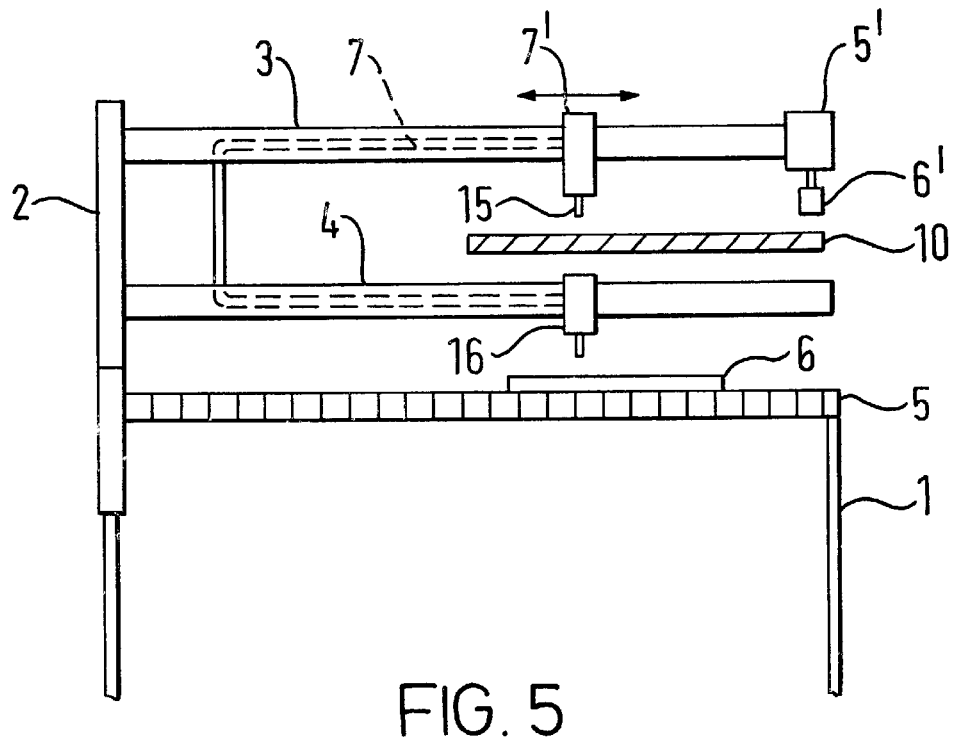
FIG. 5 shows a side view of the apparatus of FIG. 4.

Referring to the FIGS. 4 and 5 of the drawings the cutting apparatus according to this embodiment of the invention comprises a machine bed support 1 having a quarter circle profile as seen from above and carrying a workpiece supporting platform 5. The workpiece here is a steel plate 6. The rear of the apparatus has an upstanding post forming a vertical pivot for the base limb 2 of a U-shaped frame which rigidly connects upper and lower limbs 3 and 4 respectively. The end of the upper limb 3 has an electric stepper motor in a housing 5¹ which moves the limb around an arcuate track 6¹. The lower limb 4 will then follow this movement exactly.

Between the two limbs 3 and 4 a support table 10 for a cutting template, such as a drawing, is positioned. The arm 3 has a second electric stepper motor in a housing. 7¹ connected to a sensor 15. The motor 7¹ moves the sensor in the radial direction along the arm whilst the motor 5¹ moves the arm in the rotational direction.

The sensor is arranged to follow the required profile defined by the drawing or template on table 10 and this is done by control of the two motors 5¹ and 7¹. The sensor may be a photoelectric device.

The lower arm 4 carries a cutting device 16 movable in the radial direction and adapted to cut the workpiece 6. The cutting device 16 is connected rigidly through, a U-shaped frame 7¹, with the motor housing unit 7¹ and thus the sensor 15. Movement of the sensor in a radial direction is thus accurately reproduced as an identical movement of the cutting device 16 through the frame 7¹. Likewise movement in the rotational direction around pivot 2 by the motor 5¹ is translated to the cutting device 16.

The support table 10 extends only halfway along the arms 3 and 4 in order to give room for movement.

Electronic control means for the motors and the sensor are not shown nor are the gas or electric supplies to the cutting device 16.

The sensor may have a photoelectric device which follows the drawing and provides step-wise control to the motors 5¹ and 7¹.

The frame 7 may be supported for radial movement on the arms 3 and 4.

In the preferred embodiment, as shown in FIGS. 1 to 3 this invention provides a cutting apparatus which comprises a machine bed support 1 having a quarter circle profile as seen from above and carrying a workpiece supporting platform 5. The workpiece may be a steel plate 6. The rear of the apparatus has an upstanding post 2 forming a vertical pivot to which is rigidly connected upper and lower arms 3 and 4 which may thus swing in a horizontal plane. A frame 7 is supported on the arms 3 and 4 by rollers R for free movement towards and away from the post 2. The lower limb of frame 7 carries the workpiece cutting device 16 and the upper limb of this frame carries a template following sensor device 8. The sensor device 8 is arranged to follow the required profile defined by a drawing or template on table 10 and this is effected done by control of two drive motors using photo-electric template following means one motor driving a wheel 12 which frictionally engages the template and the other motor controlling the orientation of the wheel 12. The wheel is thus rotated to travel across the surface of the template and controlled directionally so that the template pattern is followed to produce a corresponding tracking movement of the frame 7 and thus the cutting device 16. In this arrangement the wheel 12 directly moves the frame 7 together with the cutting device 16 avoiding complex drives and couplings.

What is claimed is:

1. An apparatus for cutting profiles in materials, the apparatus comprising a bed with a platform to support a workpiece to be cut, a workpiece cutting device mounted on a horizontally extending arm and movable along said arm, the arm being pivoted for arcuate swinging movement about a vertical axis, a template support positioned in co-planar relationship with the platform and adapted to support a cutting template, a template following device located above the template and adapted to track the required template profile, said device being rigidly connected by a U-shaped member with the cutting device, the U-shaped member being coupled to the pivoting arm and movable along said arm, the template following device having a sensor associated with a drive means adapted to move the template following device along the required profile defined by the template.

2. An apparatus for cutting profiles in accordance with claim 1, wherein the workpiece cutting device is mounted on a first horizontally extending arm pivoted for arcuate swinging movement about a vertical pivot axis, and with means for moving the cutting device along the arm, a second horizontal arm spaced from the first said arm and connected therewith through the pivot axis, the second arm being movable by the drive means and supporting the sensor.

3. Apparatus in accordance with claim 2, wherein the first and second arms form the limbs of a U-shaped frame the base of which forms a post pivoted on the machine bed.

4. Apparatus in accordance with claim 2, wherein the template support platform is located between the arms or between the sensor and arms.

5. Apparatus in accordance with claim 1, wherein the cutting device and the sensor are rigidly connected together by a U-shaped member so as to move in unison.

6. An apparatus in accordance with claim 1, wherein the sensor and the cutting device are mounted on respective limbs of a U-shaped frame which moves in a horizontal plane about a vertical pivot the limbs accommodating the template, the sensor or tracking device on the top limb being movable linearly therealong with the sensor being connected rigidly with the cutting device, the limbs moving together in an arcuate manner to provide for cutting in any direction across the plane of the workpiece.

7. An apparatus in accordance with claim 1, wherein the sensor is driven along the template profile controlled by a photo-electric sensing means.

8. An apparatus for cutting profiles in materials, the apparatus comprising a bed with a platform to support a workpiece to be cut, a workpiece cutting device carried by one horizontally extending limb of a rigid U-shaped frame member mounted on, and movable along, an arm pivoted for arcuate swinging movement about a vertical axis, a template support positioned in co-planar relationship with the platform and adapted to support a cutting template, a template following device located above the template and mounted on the other limb of the U-shaped frame member, said device being adapted to track the required template profile, the template following device having a sensor associated with a drive means adapted to move the template following device along the required profile defined by the template.

9. An apparatus in accordance with claim 8, wherein each limb of the U-shaped frame member is mounted for movement along a respective arm each connected with a post forming a vertical pivot.

10. An apparatus in accordance with claim 9, wherein the said arms extend from the post in parallel spaced relationship, each limb of the U-shaped frame being mounted to a respective arm by roller assemblies providing freedom of movement therealong.

11. An apparatus in accordance with claim 8, wherein the template following device comprises a wheel driven over the surface of the template, the wheel being orientated to follow the template through a photo-electric sensor.

12. An apparatus for cutting profiles in sheet materials the apparatus comprising a bed with a platform to support the sheet material forming a workpiece to be cut, a workpiece cutting device mounted on a first horizontally extending arm pivoted for arcuate swinging movement about a vertical pivot axis, drive means for moving the cutting device along the arm, a template support table positioned in co-planar relationship with the platform and adapted to support a cutting template, a second horizontal arm spaced from the first said arm and connected therewith through the pivot axis, the end of the second support arm remote from the pivot being movable by drive means, the second arm having a sensor associated with the drive means adapted to move the sensor along the required profile defined by the template and being tracked by the sensor through control of the drive means, the sensor movement being coupled with the cutting device whereby said cutting device follows the required profile to cut the workpiece.

13. An apparatus in accordance with claim 12, wherein the remote end of the second support arm is supported by an arcuate track with drive means arranged to move the arm along the track about the vertical pivot.

14. An apparatus for cutting profiles in sheet materials according to claim 12 further comprising spring means engaging the sensor for pressing down the sensor.

* * * * *